(12) United States Patent
de Groot

(10) Patent No.: US 7,807,093 B2
(45) Date of Patent: Oct. 5, 2010

(54) METHOD FOR ARRANGING A THERMOPLASTIC INSERT IN A THERMOPLASTIC SANDWICH PRODUCT

(75) Inventor: Martin Theodoor de Groot, Driebergen (NL)

(73) Assignee: Fits Holding B.V., Driebergen (NL)

( * ) Notice: Subject to any disclaimer, the term of this patent is extended or adjusted under 35 U.S.C. 154(b) by 868 days.

(21) Appl. No.: 10/578,327

(22) PCT Filed: Oct. 15, 2004

(86) PCT No.: PCT/NL2004/000724

§ 371 (c)(1),
(2), (4) Date: Apr. 27, 2006

(87) PCT Pub. No.: WO2005/045263

PCT Pub. Date: May 19, 2005

(65) Prior Publication Data

US 2007/0102094 A1    May 10, 2007

(30) Foreign Application Priority Data

Oct. 27, 2003    (NL)    .................................... 1024630

(51) Int. Cl.
*B29C 65/08* (2006.01)
(52) U.S. Cl. ...................... 264/445; 264/442; 156/73.1
(58) Field of Classification Search ................. 264/442, 264/445; 156/73.1
See application file for complete search history.

(56) References Cited

U.S. PATENT DOCUMENTS

| 4,265,688 | A | * | 5/1981 | Gorski | ....................... 156/73.1 |
| 5,437,750 | A | | 8/1995 | Rinse et al. | |
| 5,536,344 | A | | 7/1996 | Van Dreumel | |
| 5,612,117 | A | * | 3/1997 | Belanger et al. | ............. 428/178 |
| 5,879,115 | A | | 3/1999 | Medal | |
| 6,153,035 | A | | 11/2000 | Van Laeken | |
| 6,287,678 | B1 | * | 9/2001 | Spengler | ................... 428/297.4 |
| 6,488,460 | B1 | * | 12/2002 | Smith et al. | .................. 411/353 |

FOREIGN PATENT DOCUMENTS

| DE | 21 13 807 A | 12/1971 |
| DE | 39 11 741 A | 10/1990 |
| DE | 41 41 616 A1 | 6/1993 |

(Continued)

OTHER PUBLICATIONS

English machine translation of DE20105550 (Aug. 16, 2001, of record).*

*Primary Examiner*—Joseph S Del Sole
*Assistant Examiner*—Robert Dye
(74) *Attorney, Agent, or Firm*—Thomas, Kayden, Horstemeyer & Risley, LLP; Todd Deveau

(57) ABSTRACT

A method for arranging a thermoplastic insert unit (2) in a thermoplastic sandwich product (1) having at least one planar or virtually planar section by the application of ultrasonic energy (6, 8). A thermoplastic sandwich product (1) comprises at least one fiber-reinforced thermoplastic covering layer (7) and a thermoplastic core which is not completely solid (8). Examples of thermoplastic sandwich products include: a flat plate, a slightly curved product, a folded product, etc. The production of a recess in the surface of the thermoplastic sandwich product, with the plastic insert unit being welded into the recess.

10 Claims, 4 Drawing Sheets

FOREIGN PATENT DOCUMENTS

| | | |
|---|---|---|
| DE | 196 10 636 A1 | 9/1997 |
| DE | 201 05 550 U1 | 8/2001 |
| EP | 0 671 992 | 11/1993 |
| EP | 0 383 409 B1 | 5/1994 |
| EP | 0 636 463 B1 | 2/1995 |
| EP | 1 160 071 A2 | 12/2001 |
| GB | 1 297 339 | 11/1972 |
| JP | 54 101878 A | 8/1979 |
| NL | 1020640 | 2/2004 |
| WO | WO 93/12344 | 6/1993 |

* cited by examiner

METHOD FOR ARRANGING A THERMOPLASTIC INSERT IN A THERMOPLASTIC SANDWICH PRODUCT

CROSS REFERENCE TO RELATED APPLICATION

This application claims priority to and the benefit of NL 1024630 dated 27 Oct. 2003 and PCT/NL2004/000724 filed 15 Oct. 2004.

FIELD OF THE INVENTION

The invention relates to a method for arranging a thermoplastic insert unit comprising a body in a thermoplastic sandwich product having at least one planar or virtually planar section, which sandwich product comprises a layer of a thermoplastic core material which is not completely solid and at least one covering layer formed from a fibre-reinforced thermoplastic.

BACKGROUND

A method for arranging a local reinforcement in a thermoplastic sandwich plate is known in the specialist field, for example from European Patent Application EP0 383 409. The method which is known from that application comprises arranging a local reinforcement in a thermoplastic sandwich plate by injection-moulding a thermoplastic into the sandwich plate. To arrange a securing point in the local reinforcement, it is possible for a metal insert to be arranged in the still-liquid injection-moulded plastic, as is described in more detail in EP0 671 992.

Another method for arranging a plastic insert unit in a sandwich plate having at least one thermoplastic fibre-reinforced covering layer is known in the specialist field, for example from U.S. Pat. No. 5,437,750. The method which is disclosed in that document comprises placing and bonding a plastic insert unit in a sandwich plate, comprising two fibre-reinforced thermoplastic covering layers which are adhesively bonded to a core layer comprising a multiplicity of strips of aramid paper or another thin-lightweight material, which are adhesively bonded and deformed in such a manner that an array of honeycomb cells is formed. This method comprises drilling a hole through the sandwich plate, placing a thermoplastic insert unit in the hole and then fusing the thin sides on top of the plastic insert unit to the fibre-reinforced thermoplastic covering layers by the application of ultrasonic energy.

Another method which describes the welding of a thermoplastic insert unit into a sandwich plate comprising fibre-reinforced thermoplastic covering layers adhesively bonded to a honeycomb is presented in U.S. Pat. No. 5,536,344. This method describes arranging a plastic insert unit by means of rotation welding.

SUMMARY

The object of the present invention is to provide a method for arranging a thermoplastic insert unit in a thermoplastic sandwich product and to further optimize and simplify the arraigning of thermoplastic insert units in a thermoplastic sandwich product, allowing costs and weight to be saved.

The method of the type described in the introduction, according to the invention, for this purpose comprises the steps of forming a hole in the covering layer of the thermoplastic sandwich product, with core material being removed;

placing the plastic insert unit in the hole;

positioning the insert unit between a horn and an anvil of an ultrasonic apparatus;

applying ultrasonic energy and pressure, so that heat is generated between the plastic insert unit and the covering layer of the thermoplastic sandwich product;

fixing the insert unit through cooling after sufficient heat has been supplied to allow fusion between the plastic insert unit and the covering layer of the thermoplastic sandwich product.

The method according to the present invention for arranging a thermoplastic insert unit in a thermoplastic sandwich product in general involves drilling a hole into the covering layer of the thermoplastic sandwich product, the size of this hole usually corresponding to at least the maximum dimensions of the cross section of the body of the plastic insert unit. Then, the thermoplastic insert unit is placed in the hole in the thermoplastic sandwich product, after which heat is generated on the contact surfaces between the thermoplastic insert unit and the fibre-reinforced thermoplastic covering layer or layers through the application of ultrasonic energy and pressure, and the addition of sufficient heat allows the abovementioned contact surfaces to be fused together there. After cooling, preferably under pressure, the thermoplastic insert unit is fixed in the thermoplastic sandwich product.

The term "sandwich product" as used in the present description encompasses a thermoplastic sandwich product having at least one planar or virtually planar section, in other words a substantially planar section. Examples include a flat plate; a slightly curved product, a folded product, a slightly curved three-dimensionally shaped product, etc.

The sandwich product advantageously comprises a top covering layer formed from a fibre-reinforced thermoplastic, a core layer formed from a thermoplastic, in particular a foam layer, and a bottom cove layer formed from a fibre-reinforced thermoplastic. In the text which follows, the covering layer in which the insert unit is arranged is always referred to as the top covering layer, although it is not fundamentally necessary for there also to be a bottom covering layer, unless expressly stated otherwise.

The insert unit formed from the thermoplastic preferably comprises a body and a flange. The insert unit may comprise an internally threaded bore.

As has already been stated above, in a preferred embodiment the dimensions of the hole are substantially equal to the dimensions of the cross section of the body of the insert unit. However, the dimensions of the hole may also be larger and/or smaller, as will be explained in more detail below. With the aid of the method according to the invention as described above, on the one hand the underside of the flange of the thermoplastic insert unit can be fixed to the top side of the top covering layer of the thermoplastic sandwich product, and on the other hand, given appropriate dimensions of the thermoplastic insert unit, it is possible to effect simultaneous bonding between the underside of the thermoplastic insert unit and the top side of the bottom covering layer of the thermoplastic sandwich product. In the case of an insert unit without a flange, the underside of the insert unit can be fixed to the top side of the bottom covering layer of the thermoplastic sandwich product.

The plastic insert unit generally has a circular flange with a diameter which is larger than the diameter of the body, which is advantageously also circular, of the plastic insert unit. The thermoplastic material of the insert unit is preferably the same as or at least compatible with the thermoplastic in the fibre-reinforced covering layer or layers and the thermoplastic in the core.

In a preferred embodiment of the method according to the present invention, the top covering layer, at the location where the insert unit is to be arranged, is removed in the shape of the largest diameter of the body of the plastic insert unit. Thereafter, it is preferable for no thermoplastic core material or only a portion of the thermoplastic core material to be removed, in order on the one hand to increase the dimensional tolerance for the insert unit and on the other hand to minimize the (reduced) visibility of the imprint of the bonding between the insert unit and the bottom covering layer.

A further preferred embodiment of the method according to the invention is that as a result of the use of the foam in the core layer of the sandwich product, what is known as the cushion effect occurs when the insert unit is welded into the sandwich plate. The cushion effect involves the foam being heated, by means of ultrasonic energy and pressure, to around and in the vicinity of the melting point of the thermoplastic of the core layer, with the result that the ultrasonic energy cannot be transmitted via a rigid connection via the body of the insert unit to the bottom covering layer. This is because such transmission imparts a concentration of energy and therefore heat to the top side of the flange of the it unit and/or the bottom covering layer at the location of the underside of the body of the insert unit, which should be avoided in particular when using insert units without metal, such as insert units made via the composite flow moulding process, which is known per se, because this leads to damage to the top side of the flange and the plastic screw thread, if present.

Yet another preferred embodiment of the method according to the present invention is based on the surprising discovery that the structural integrity of the insert unit in the sandwich product is increased by on the one hand making the hole in the top covering layer of the thermoplastic sandwich product smaller than the largest cross section of the body of the thermoplastic insert unit and/or on the other hand, in the top covering layer, dividing the cross section, at most at the size of the maximum cross section through the body of the insert, into at least two or more parts, or a combination of these two measures, and then using the method of the present invention. It is assumed that the above effect is caused by on the one hand the increase in the size of the bonding surface area between the thermoplastic insert unit and the thermoplastic sandwich product and on the other hand the boosting of the stability of the hole, for example by folding over the top covering layer, in terms of the resistance to the thermoplastic insert unit being pulled out of the thermoplastic sandwich product. This provides the possibility of further reducing the dimensions and therefore the weight of the insert unit, which is very important when the products obtained are used in the transport sector, in particular in the aerospace and aeronautical industry.

In some of the abovementioned embodiments, it may be desirable first of all to place the thermoplastic insert unit in the thermoplastic sandwich product, with the aid of pressure and velocity, then to fix the insert unit in the sandwich product by the application of ultrasonic energy and pressure.

In a further preferred embodiment of the present invention, first of all a recess is formed in the surface of the thermoplastic sandwich product, after which the thermoplastic insert unit, using the method steps described above, such as the drilling of a hole into the recess and placing of the insert unit in the hole, is welded into the recess in the thermoplastic sandwich product by the application of ultrasonic energy and pressure.

The use of the abovementioned recess provides the option of welding the top side of the plastic insert unit at least flush with the top covering layer of the thermoplastic sandwich product. Furthermore, the length of the thermoplastic insert unit can be reduced by the use of a recess in the thermoplastic sandwich product and the ultrasonic welding of the plastic insert unit in the recess, with the result that the weight of the plastic insert unit is reduced, which is particularly important in the transport industry, in particular the aerospace and aeronautical industry.

The abovementioned recess in the surface of the thermoplastic sandwich product is advantageously formed by the use of what is known as the hot/warm heating method, in which a heated, hot, metal deformation stamp is placed on the surface of the thermoplastic sandwich product, after which the metal stamp sinks into the thermoplastic sandwich product as a result of a combination of pressure, temperature and time, through plastic deformation and melting of the thermoplastic in the top covering layer and the core. As soon as the desired deformation of the top covering layer of the thermoplastic sandwich product has been reached, the deformation stamp is removed and within seconds a hot consolidation stamp of the final shape of the recess is placed under pressure in the recess which has already been formed. The recess then preferably cools under pressure, and as soon as the temperature of the thermoplastic of the top covering layer in the recess has dropped below the glass transition temperature of the thermoplastic, the consolidation stamp can be removed. The time between removal of the deformation stamp and placing of the consolidation stamp in the recess which has been formed in the thermoplastic sandwich product must be sufficiently short for the top covering layer not to have cooled below the melting point—10%, in order to produce the recess which is ultimately desired, and this time will generally be at most 10 seconds. The resulting recess is in the shape of the consolidation stamp.

The temperature of the deformation stamp is in the vicinity of the melting point of the thermoplastic in the top covering layer, ±10%. The temperature of the consolidation stamp is equal to or 10-30% lower than the glass transition temperature of the thermoplastic of the top covering layer of the thermoplastic sandwich product, in order to prevent a temperature shock. The shape of the deformation stamp, which is used to heat the surface of the top covering layer of the thermoplastic sandwich product, does not necessarily have to be identical to the shape of the consolidation stamp. There are no restrictions imposed on the shape of the deformation stamp. Examples of suitable shapes include: planar, a slightly convex shape, etc. There are no restrictions on the shape of the consolidation stamp, but this shape will generally be matched to the shape of the underside of the flange of the insert unit. Of course, the abovementioned recess can also be formed via the hot/warm deformation method with a cooling feature fitted in the deformation stamp, which then also serves as the consolidation stamp.

A further embodiment of the present invention comprises arranging a reinforcing layer in the recess. For this purpose, a piece of prepreg or laminate (consolidated prepreg) is placed onto the surface of the covering layer at the location where the recess is to be formed. If appropriate, the prepreg or laminate can be fixed by ultrasonic welding. Then, the recess is formed using the hot/warm deformation method, as has already been described above. However, for successful consolidation of the prepreg or laminate in the recess, the deformation temperature is selected to be in the range of the melting point of the thermoplastic in the top covering layer −5% and +10%, with the heat-up time being shorter and the time between the deformation stamp being lifted and the consolidation stamp being brought to bear being kept minimal in order to prevent sagging of the thermoplastic core material. A plastic insert unit can then be welded into the reinforced recess which has been formed.

The abovementioned hot/warm deformation method can also be used to apply letters or names, for example of airlines, such as KLM, in the thermoplastic sandwich product using a recess.

In an alternative method for fixing an insert in a thermoplastic sandwich product with the aid of a thermosetting resin, first of all a hole, at most of the size of the cross section of the body of the insert, is drilled or milled in the thermoplastic sandwich product through one or both covering layer(s). Then, the thermoplastic core material is removed or melted to continuously dense material between the covering layers, generally over the entire surface and height around the hole, with the aid of heat, for example a heated, hot (T is greater than the glass transition temperature of the thermoplastic in the core) metal wire, if appropriate provided with a small piece of flat metal. The distance around the hole from which the core material is removed is dependent on the use and thickness of the sandwich product, but will generally be some 2-3 times the cross section of the hole.

The abovementioned method has the advantage that the covering layers do not have to be removed, as in the case of Nomex honeycomb sandwiches, with the result that better transmission of force is maintained, and consequently the quantity of thermosetting resin can be reduced.

A thermoplastic sandwich product comprises at least one fibre-reinforced thermoplastic covering layer, joined to a core consisting of a thermoplastic which is not completely solid, the possible joining layer between the covering layer and the core consisting of a thermoplastic.

It is preferable for the thermoplastic of the covering layer or layers, intermediate layer and reinforcing layer to be identical to or at least compatible with the thermoplastic of the core. The thermoplastic of the covering layer or layers, intermediate layer and reinforcing layer and core are not subject to any particular restrictions. Examples include PEI polyetherimide (Ultern produced by General Electric); PES polyethersulfon; PC polycarbonate, PP polypropylene or mixtures of copolymers, etc. The thermoplastic core material which is not completely solid of the thermoplastic sandwich product may optionally be reinforced with fibres or with nano-particles. Examples of forms of cores include: isotropic foam; an-isotropic foam; thermoplastic honeycomb; co-extrudates; chopped fibres comprising thermoplastic (Azdel), etc.

The thermoplastic sandwich product may include one or more intermediate layers. With a view to costs and weight, the abovementioned intermediate layer or layers will only be used in sandwich products which do not employ a film of adhesive, for example for sandwich products produced using what is known as the in-situ foaming method, as described in EP 0 636 463 in the name of the present Applicant.

The choice of fibre in the core material, the covering layer or layers, the intermediate layer or layers, the reinforcing layer and in the plastic insert unit is not subject to any restriction whatsoever. Inorganic fibres, such as glass fibres, metal fibres, carbon fibres, and organic fibres, such as aramid fibres, can be used as desired, as can natural fibres, provided that they are able to withstand the conditions encountered while the method is being carried out.

The fibres in the covering layer or layers, the intermediate layer or layers and the reinforcing layer may optionally be oriented, and there are no restrictions whatsoever on the length and orientation. Knitted fabrics, woven fabrics, mats, cloths and unidirectional fibres represent various manifestations thereof. The fibres in the plastic insert unit may be orientated or not oriented. The length and orientation of the fibres are not subject to any restrictions whatsoever; short fibres, long fibres and unidirectional fibres represent various embodiments thereof.

A preferred embodiment of a thermoplastic sandwich product comprises two covering layers formed from fibre-reinforced polyetherimid and a core of polyetherimid foam, the core having been produced using what is known as the in-situ foaming process as described in EP 0 636 463 in the name of the present Applicant. The result is a core layer of anisotropic foam, which is characterized by a high compressive strength in a direction perpendicular to the covering layer. The thermoplastic sandwich product obtained in this way is characterized by a relatively high flexural strength, a low weight and very good fireproofing properties. The high compressive strength and the homogeneous distribution of the foam over the surface have a beneficial effect on the introduction of the thermoplastic insert unit by means of ultrasonic energy and pressure.

The range of applications for the abovementioned products obtained with the aid of the method according to the invention includes interior products for aircraft, trains, boats, etc.

It is also possible for the thermoplastic material of the core to be significantly different from the thermoplastic of the fibre-reinforced covering layer, for example PEI in-situ foam with PC fibre-reinforced covering layers. cf. NL 1020640 in the name of the present Applicant. In this case, it is generally necessary to drill a hole and remove all or virtually all the core material.

BRIEF DESCRIPTION OF THE DRAWINGS

The invention is explained below on the basis of the appended drawing, in which.

DETAILED DESRIPTION

Figure 1:
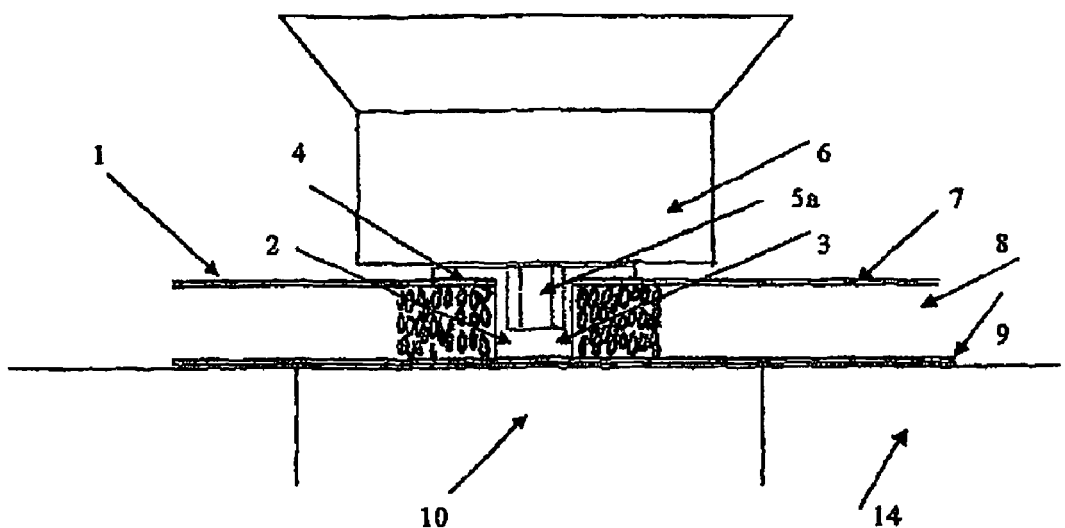
FIG. 1 shows a general cross section through the ultrasonic welding of a plastic insert unit into a thermoplastic sandwich product.

Referring to FIGS. 1-11, a thermoplastic insert unit 2 is fixed in a thermoplastic sandwich product 1 as a result of the present invention. The thermoplastic sandwich product 1 made in accordance with the preferred embodiment comprises a PEI fibre-reinforced top covering layer 7, an in-situ foamed PEI thermoplastic core 8 and a bottom PEI fibre-reinforced covering layer 9.

The thermoplastic insert unit 2 is made from a, preferably fibre-reinforced, thermoplastic, such as polyetherimid and may include a steel insert 5 or a hole in which a screw thread is arranged, so that the insert unit can function as a securing point in the sandwich product 1.

Figure 2:
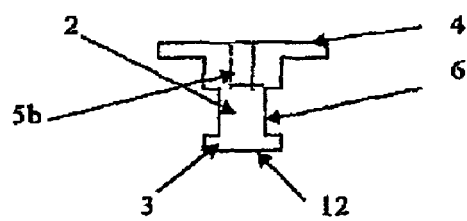
FIG. 2 shows a cross section through an example of a plastic insert unit.

The plastic insert unit 2 generally has a cylindrical body 3 with a circular flange 4. The cylindrical body 3 may locally have a smaller diameter 6, as shown in FIG. 2, between the flange 4 and the end of the insert unit 12. The abovementioned insert unit 2 may be produced, for example, using the injection-moulding process from a thermoplastic reinforced with short fibres or, for example, by means of the abovementioned composite flow molding process using a continuously fibre-reinforced thermoplastic.

Figure 3:
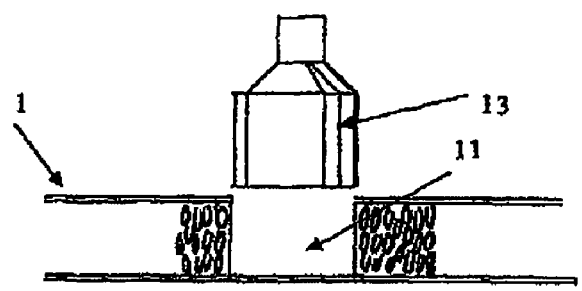
FIG. 3 shows the drilling of a hole in a thermoplastic sandwich product.

Referring now to FIG. 3, a hole 11 with a predetermined diameter is formed at a desired location in the thermoplastic sandwich product 1, for example using a low-speed drill. The cutting tool used to produce the hole may also be a manually or automatically operated milling machine. Then, the thermoplastic insert unit 2 is placed in the hole 11. The dimension of the length of the cylindrical part 3 of the insert unit is accurately matched to the thickness of the sandwich product 1, so that fusion can occur between the underside of the flange 4 and the top covering layer 7 and between the underside 12 of the insert unit 2 and the top side of the bottom covering layer 9. The diameter of the drill 13 is generally equal to or slightly greater than diameter of the cylindrical part 3 of the insert unit 2.

Figure 4:
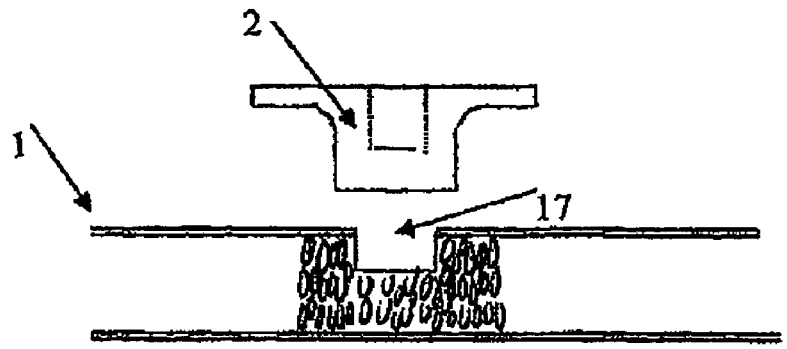
FIG. 4 shows the arranging of a plastic insert unit in a hole with a diameter which is smaller than the largest diameter of the body of the insert unit without all the core material in the hole having been removed.

If the diameter of the drill 13 is smaller, for example by 2-4 mm, than the diameter of the cylindrical part 3 of the insert unit 2, the insert unit 2 can first of all be placed in the sandwich product 1 under pressure and/or velocity. cf. FIG. 4. The circular flange 4 has a diameter which is greater than the diameter of the drill 13 or greater than the maximum diameter of the cylindrical part 3 of the insert unit 2, and is relatively thin compared to the cylindrical part 3 of the insert unit 2. FIG. 3 and FIG. 1 illustrate the installation of an in unit 2 by drilling and welding. The planar or virtually planar section of the thermoplastic sandwich product is then placed onto a bench 14 and positioned in such a manner that the insert unit 2 is located between the horn 6 and the anvil 10 of the ultrasonic apparatus. The insert unit may also be placed on the hole. The horn 6 of the ultrasonic apparatus, for example the 900 series produced by Branson Ultrasonic Corporation, is then placed just above the insert unit 2. The application of ultrasonic energy and pressure produces heat between the contact surfaces of the thermoplastic insert unit 2, namely the underside of the flange 4 with the top side of the top covering layer 7 and simultaneously the underside 12 of the insert unit 2 with the top side of the bottom covering layer 9. If sufficient heat has been generated for the contact surfaces of the insert unit 2 and the covering layers 7, 9 to be plasticized and fused together, the application of ultrasonic energy is stopped. After cooling, preferably under pressure, the insert unit 2 is fixed (welded) in the thermoplastic sandwich product 1.

Figure 5:
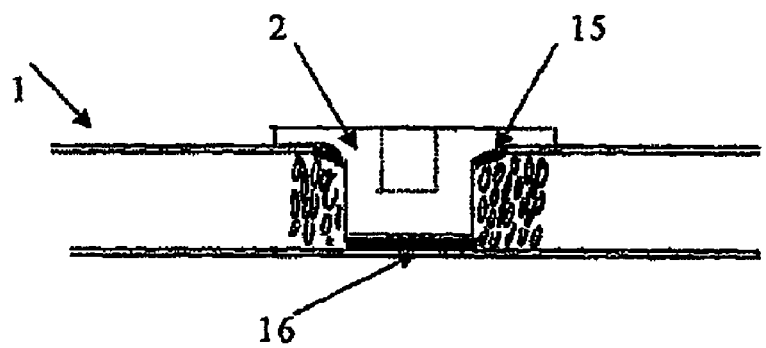
FIG. 5 shows the plastic insert unit welded into the thermoplastic sandwich product from FIG. 4.

If a hole 17 with a diameter which is smaller than the maximum diameter of the body of the insert is used, cf. FIG. 4, the result is a larger bonding surface 13, cf. FIG. 5.

FIG. 5 also indicates, by reference numeral 16, that the core material is compressed and melted by the application of ultrasonic energy and pressure. It is preferable for less than 90% of the core material to be removed, in order thereby to increase the dimensional tolerance between the insert unit with regard to the distance between the underside of the flange and the underside of the body of the insert unit and the thickness of the thermoplastic sandwich product.

The above option is preferably used for the ultrasonic welding of completely plastic insert units, such as those produced by means of the abovementioned flow moulding process, in order to prevent damage to the hole, which is often threaded, in the insert unit.

Figure 6:
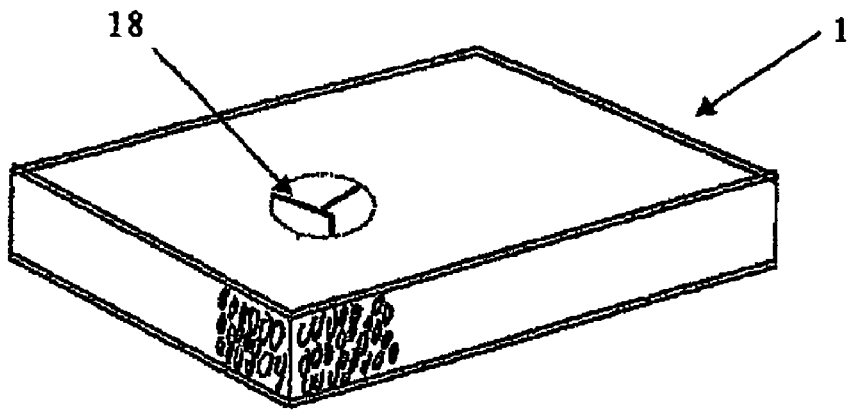
FIG. 6 shows an example of a notch in the top covering layer of a thermoplastic sandwich product.
Figure 7:
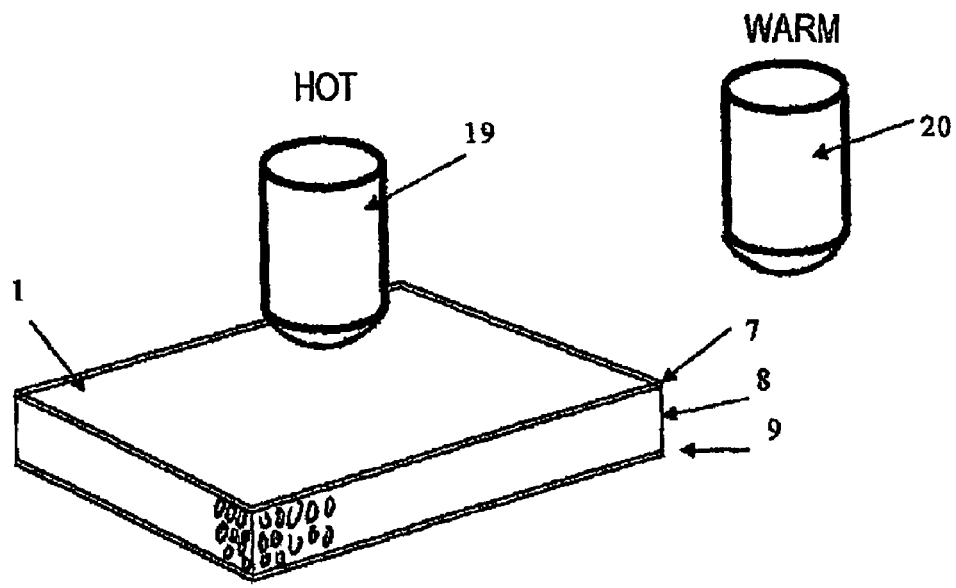
FIG. 7 shows an example of a hot deformation stamp which is placed onto the thermoplastic sandwich product.
Figure 8:
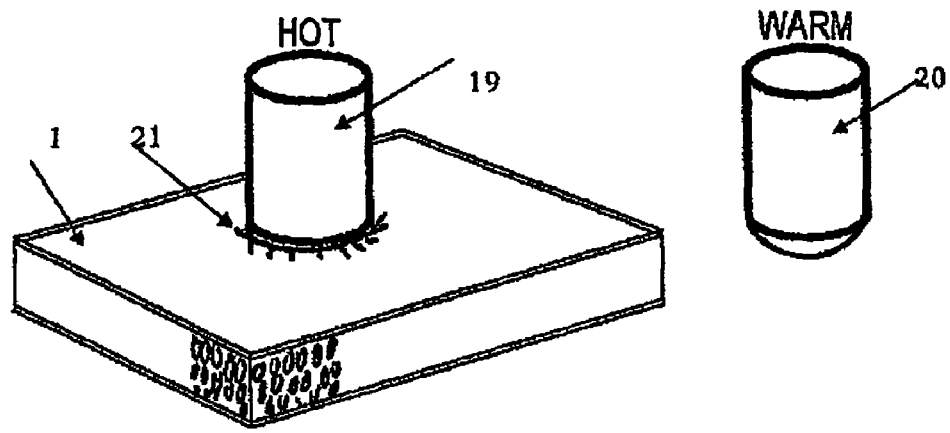
FIG. 8 shows an example of the preliminary recess formed in the thermoplastic sandwich product as a result of the deformation stamp having been lowered to the desired position in the thermoplastic sandwich product.
Figure 9:
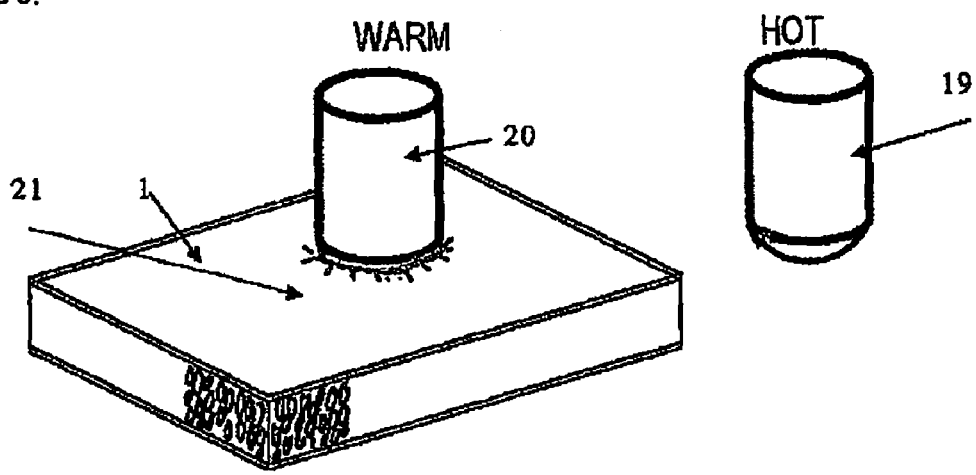
FIG. 9 shows the consolidation of the desired recess in the thermoplastic sandwich product by the consolidation stamp being placed in the recess which has already been formed.
Figure 10:
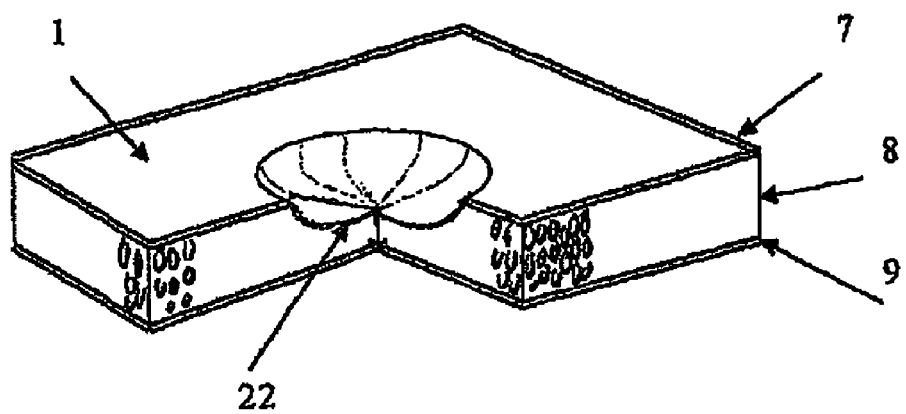
FIG. 10 shows an example of a cross section through a recess in a thermoplastic sandwich product.

If the hole is notched 18 rather than drilled, it is also possible for the top covering layer to be used to reinforce the hole, cf. FIG. 6.

The above options for using the sandwich material (core and top covering layer) at the largest beneath of the body of the insert unit when arranging the insert unit in a thermoplastic sandwich product can, of course, be combined in all manner of ways.

To save weight and/or the need for the top side of the insert unit to be located flush with or beneath the surface of the top covering layer 7 of the thermoplastic sandwich product 1, it is possible for a recess 22 (FIG. 10) to be formed in the thermoplastic sandwich product 1 before the thermoplastic insert unit 2 is welded in the recess 22 in the thermoplastic sandwich product 1. The recess 22 in the thermoplastic sandwich product 1 can be produced using what is known as the hot/warm deformation method.

The hot/warm deformation method involves a heated, hot metal stamp 19 being placed onto the top covering layer 7 of the thermoplastic sandwich product 1, then the metal stamp 19 slowly sinking into the thermoplastic sandwich product 1 as a result of a combination of pressure, temperate and time causing the top covering layer 7 and the foam 8 to soften and/or melt. When the required preliminary shape 21 of the recess 22 has been made in the thermoplastic sandwich product 1, within a few seconds the consolidation stamp 20 having the final shape is placed into the preliminary shape 21, with the result that the latter is consolidated to form the final shape of the recess 22. The hot deformation stamp 19 is generally at a temperature equal to the melting point ±10% of the thermoplastic of the top covering layer 7 of the thermoplastic sandwich product 1. The consolidation stamp 20, which is generally metal, is generally at a temperature which is lower than the glass transition temperature of the thermoplastic in the top covering layer 7. By way of example, a hole is drilled in the recess 22 in the thermoplastic sandwich product 1, as has already been described in the present invention, after which the plastic insert unit 2 is welded into the hole in the recess 22 with the aid of pressure and ultrasonic energy. It will be clear that the size of the insert unit 2, body 3 and flange 4 is dependent on the thermoplastic sandwich product 1 used, the particular application, the recess employed and the selection of material for the insert unit 2.

By means of the present invention, it is possible for a thermoplastic insert unit 2 to be secured in the thermoplastic sandwich product 1 in less than 10 seconds. It has been found that using the present invention gives a significant reduction in working time, costs and weight, in particular when using insert units which have been produced using the composite flow moulding process.

Figure 11:
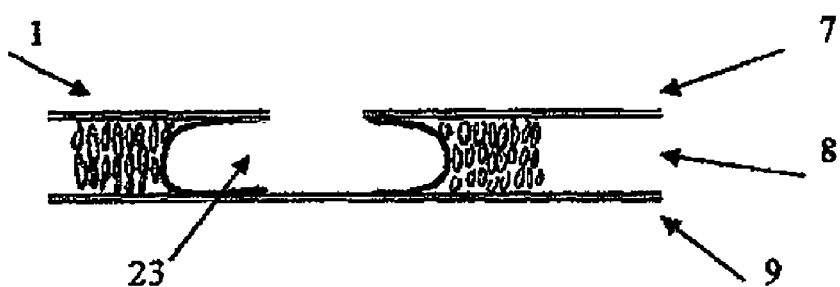
FIG. 11 shows an example of a hole for arranging a thermosetting resin in a thermoplastic sandwich product.

The removal of the foam, with the aid of heat, around a hole produces a cavity 23 in the thermoplastic sandwich product 1, cf. FIG. 11. This cavity can be filled with a thermosetting resin to function as an additional reinforcement for the securing point.

The invention claimed is:

1. Method for arranging a thermoplastic insert unit comprising a body and a flange having a larger cross-section than the body, in a thermoplastic sandwich product having at least one substantially planar section, which sandwich product comprises a layer of a thermoplastic foam core material and at least one covering layer formed from a fiber-reinforced thermoplastic, the method comprising the steps of forming a hole having a cross-section smaller than the flange in the covering layer of the thermoplastic sandwich product, with core material being removed; placing the thermoplastic insert unit in the hole; positioning the thermoplastic insert unit between a horn and an anvil of an ultrasonic apparatus; applying ultrasonic energy and pressure, so that heat is generated between the thermoplastic insert unit and the fiber-reinforced covering layer of the thermoplastic sandwich product; fixing the thermoplastic insert unit through cooling after sufficient heat has been supplied to allow fusion between the underside of the thermoplastic insert unit and the outer surface of the fiber-reinforced covering layer of the thermoplastic sandwich product, in which the covering layer is notched at the position of the hole to be made, a hole is provided in the thermoplastic foam core material and the covering layer is folded into the hole.

2. Method according to claim 1, in which the sandwich product comprises a top covering layer formed from a fiber-reinforced thermoplastic, a thermoplastic foam core layer and a bottom covering layer formed from a fiber-reinforced thermoplastic.

3. Method according to claim 1, in which the dimensions of the hole are equal to the dimensions of the body of the thermoplastic insert unit.

4. Method according to claim 1, in which the body of the thermoplastic insert unit is matched to the thickness of the sandwich product such that application of ultrasonic energy and pressure effects simultaneous fusion of the underside of the thermoplastic insert unit to the top side of the bottom covering layer and the underside of the flange of the thermoplastic insert unit to the top side of the top covering layer of the thermoplastic sandwich product.

5. Method according to claim 4, wherein less than 90% of the thermoplastic foam core to be occupied by the thermoplastic insert unit is removed.

6. Method according to claim 1, also comprising a step of forming a recess by deformation in a surface of the thermoplastic sandwich product before a thermoplastic insert unit is placed in the hole formed in the covering layer the, recess configured to receive the flange of the thermoplastic insert unit.

7. Method according to claim 6, in which the recess is applied using a deformation method.

8. Method according to claim 7, in which the recess in the top covering layer of the thermoplastic sandwich product is reinforced with an additional fiber-reinforced thermoplastic layer.

9. Method according to claim 1, wherein said cooling is performed under pressure.

10. Method for arranging a thermoplastic insert unit comprising a body and a flange having a larger cross-section than the body, in a thermoplastic sandwich product having at least one substantially planar section, which sandwich product comprises a layer of a thermoplastic foam core material and at least one covering layer formed from a fiber-reinforced thermoplastic, the method comprising the steps of forming a hole having a cross-section smaller than the flange in the covering layer of the thermoplastic sandwich product, with core material being removed; placing the thermoplastic insert unit in the hole; positioning the thermoplastic insert unit between a horn and an anvil of an ultrasonic apparatus; applying ultrasonic energy and pressure, so that heat is generated between the thermoplastic insert unit and the fiber-reinforced covering layer of the thermoplastic sandwich product; fixing the thermoplastic insert unit through cooling after sufficient heat has been supplied to allow fusion between the underside of the thermoplastic insert unit and the outer surface of the fiber-reinforced covering layer of the thermoplastic sandwich product, also comprising a step of forming a recess in a surface of the thermoplastic sandwich product before a thermoplastic insert unit is placed in the recess, in which the recess is applied using a deformation method, wherein the deformation method comprises a step of placing a deformation stamp having a temperature in the range of the melting point ±10% of the thermoplastic of the fiber-reinforced thermoplastic covering layer, on the fiber-reinforced thermoplastic covering layer under pressure and for a time sufficient to allow plastic deformation and melting of the top covering layer and the core, then placing a consolidation stamp having the final shape of the recess at a temperature in the range of 70-100% of the glass transition temperature of the thermoplastic in the fiber-reinforced thermoplastic covering layer under pressure on the deformed fiber-reinforced thermoplastic covering layer and allowing the recess to cool to below the glass transition temperature of the thermoplastic in the fiber-reinforced thermoplastic covering layer.

* * * * *